Aug. 26, 1930.  L. C. NIELSEN ET AL  1,774,034
FILE TESTING MACHINE
Filed June 15, 1928  5 Sheets-Sheet 2
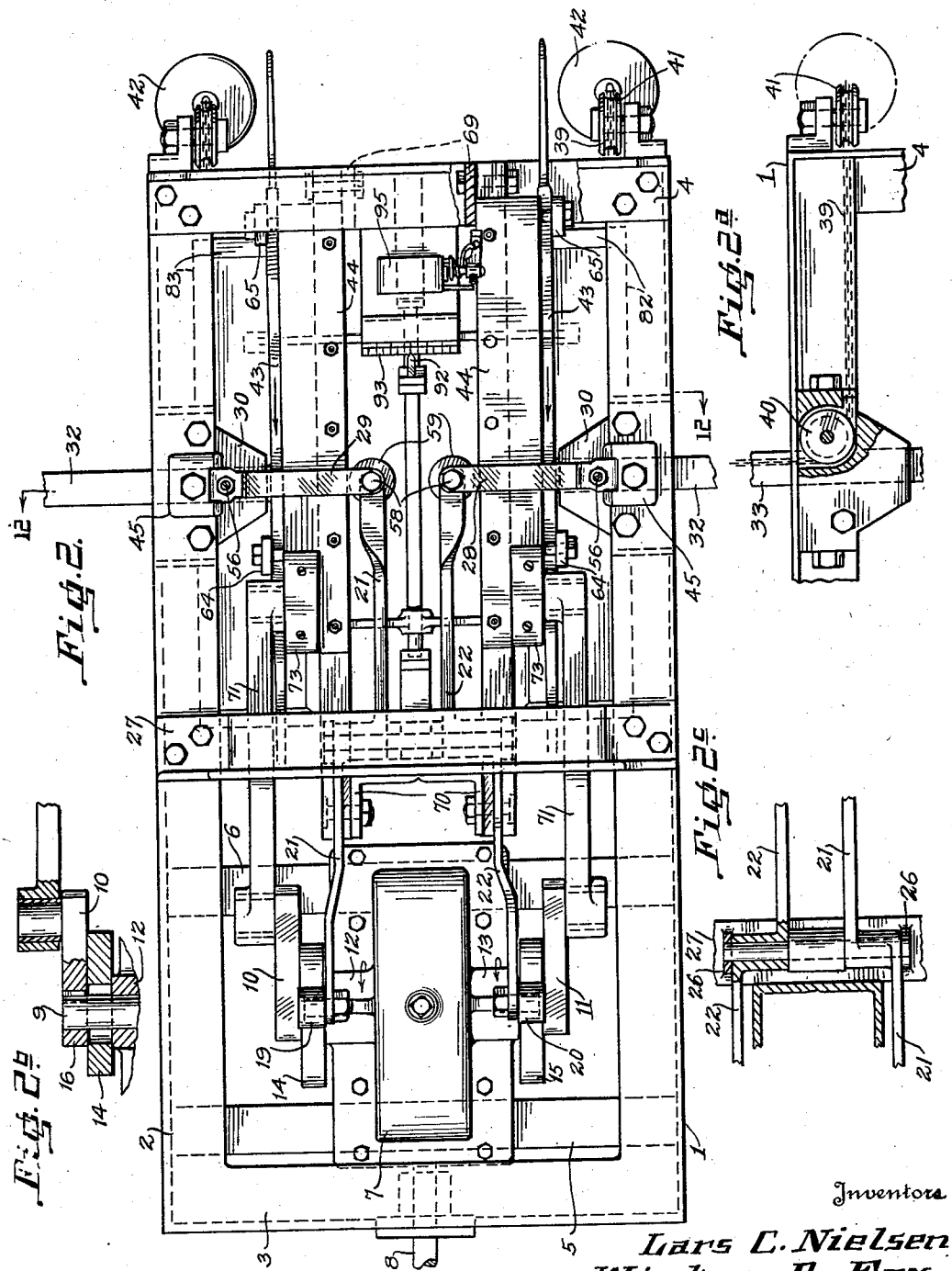
Inventors
*Lars C. Nielsen*
and *Winters B. Fox*
By *Mason Fenwick Lawrence*
Attorneys

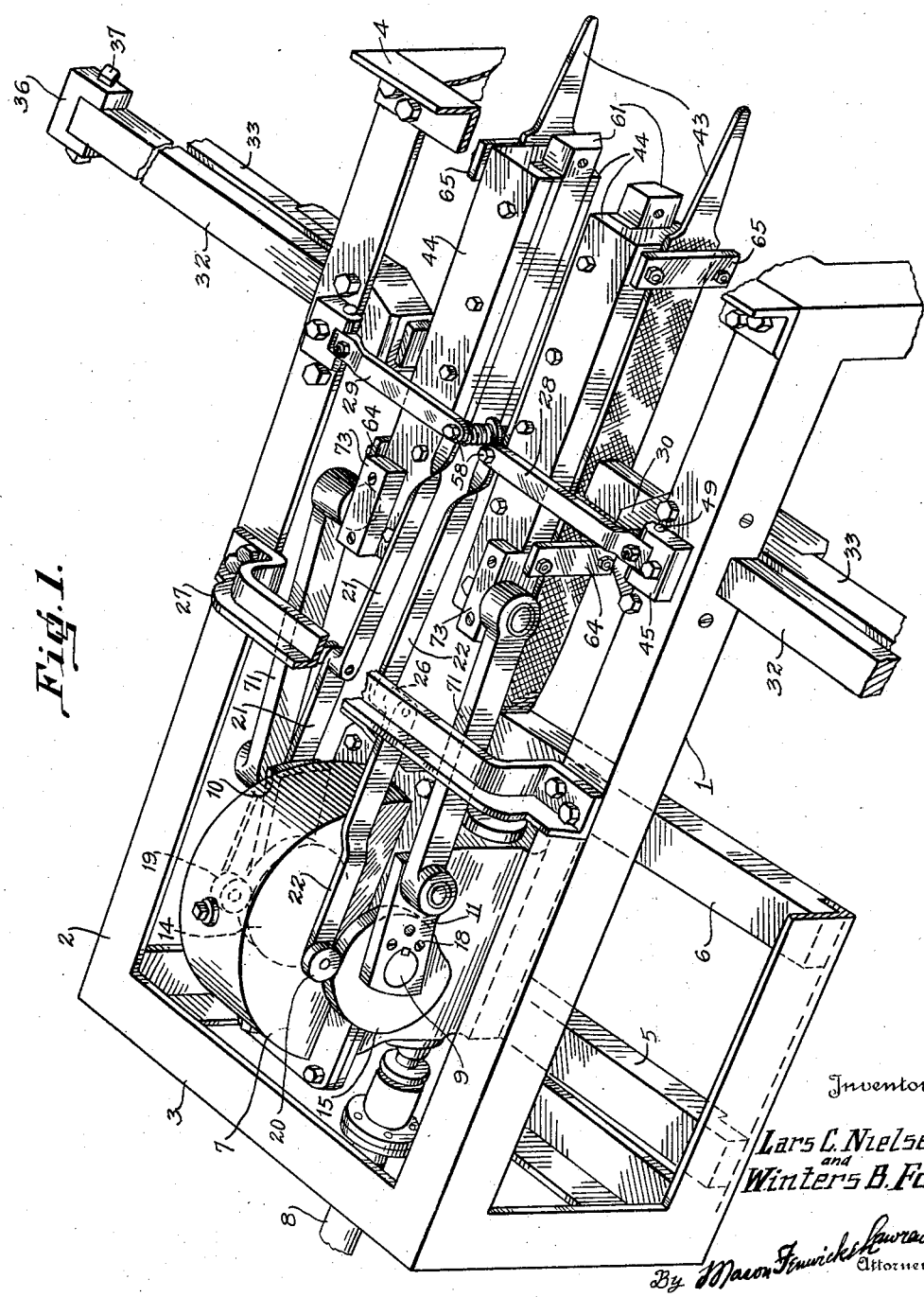

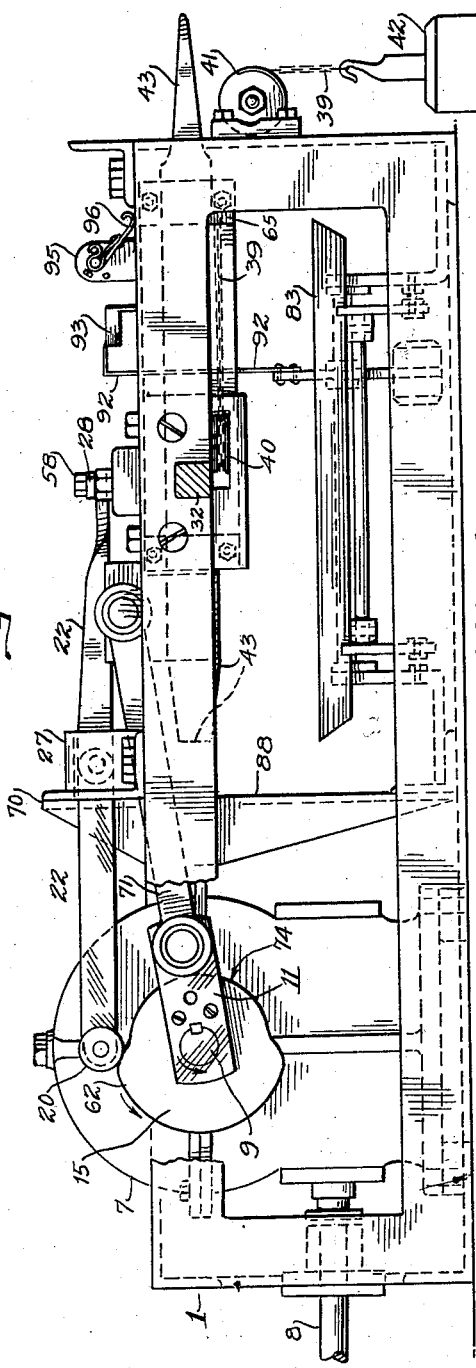
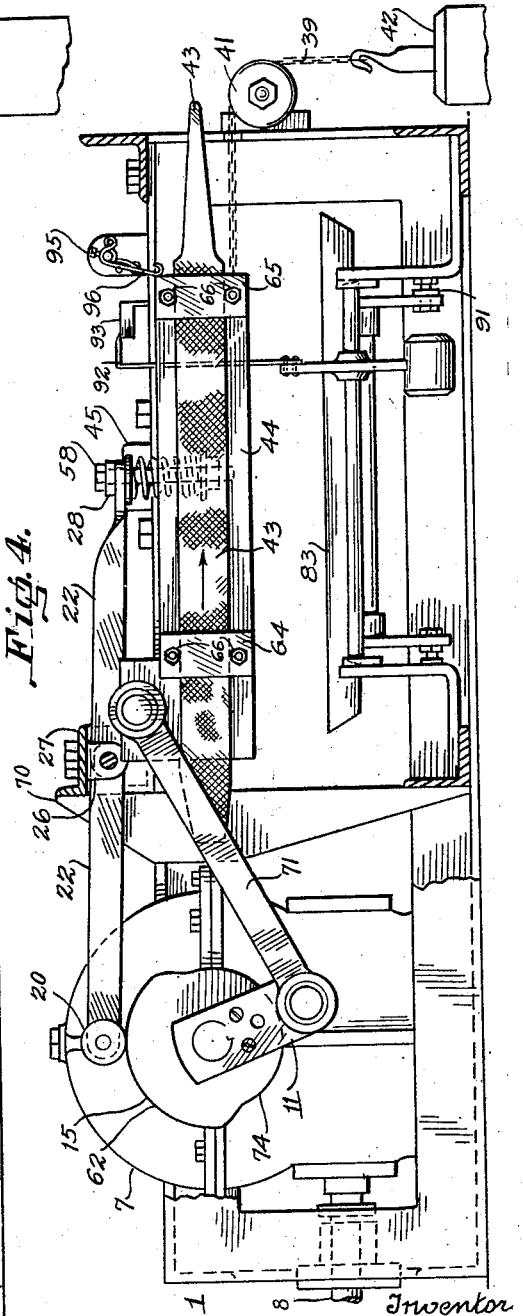

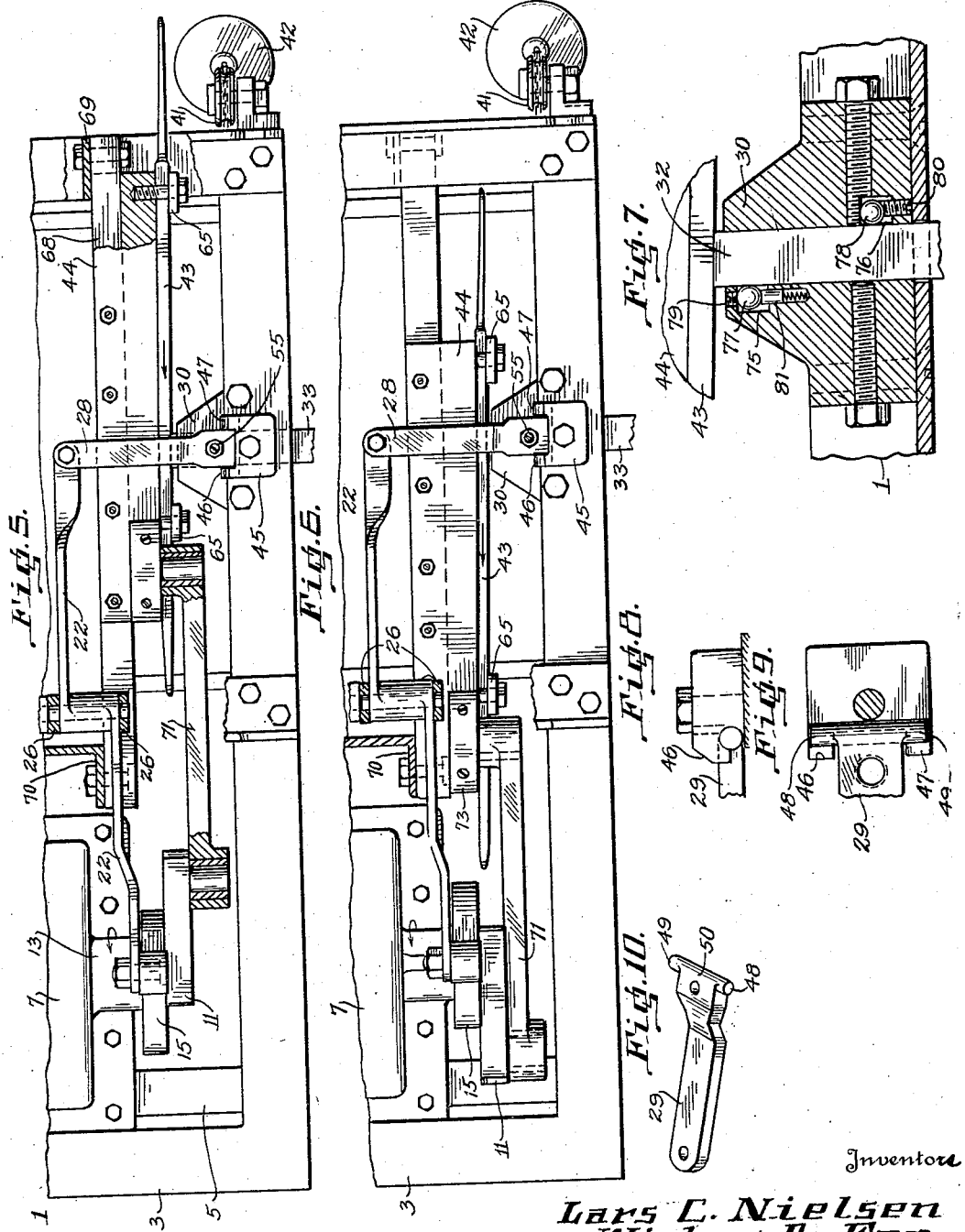

Aug. 26, 1930.    L. C. NIELSEN ET AL    1,774,034
FILE TESTING MACHINE
Filed June 15, 1928    5 Sheets-Sheet 5
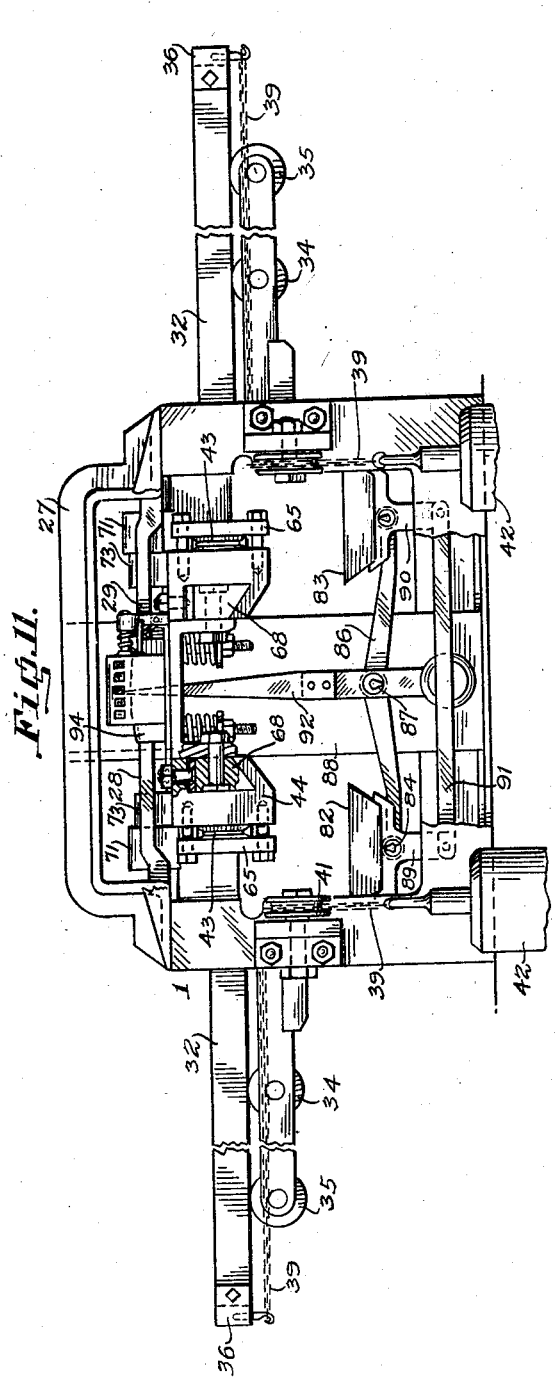
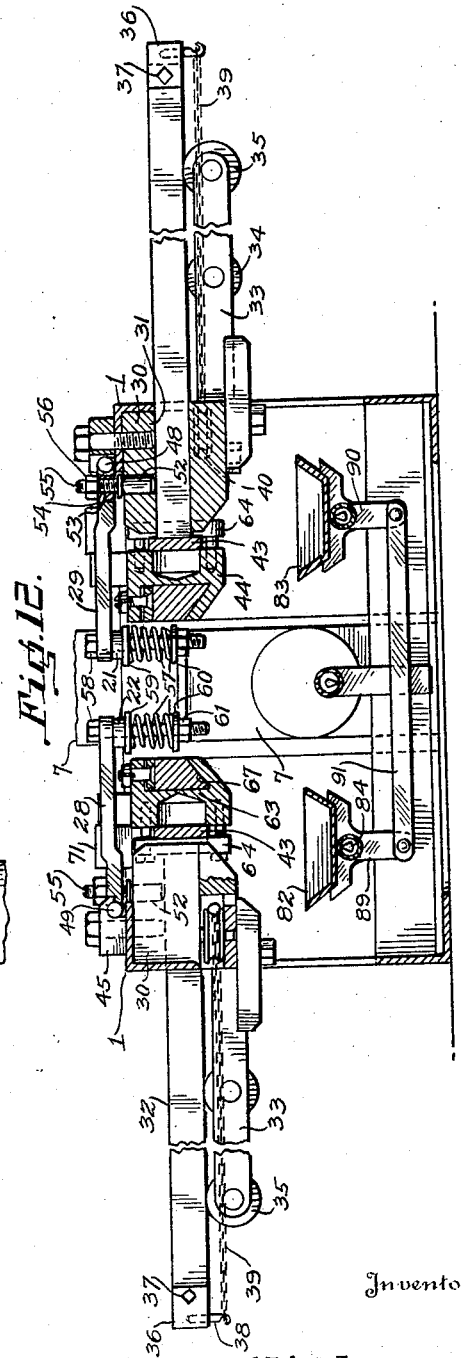
Inventors
Lars C. Nielsen
and Winters B. Fox
By Mason Fenwick Lawrence
Attorneys Patented Aug. 26, 1930

1,774,034

UNITED STATES PATENT OFFICE

LARS CHRISTIAN NIELSEN AND WINTERS BOWERS FOX, OF PHILADELPHIA, PENNSYLVANIA, ASSIGNORS TO CARVER FILE COMPANY, OPERATED AS THE DELTA FILE WORKS, OF PHILADELPHIA, PENNSYLVANIA

FILE-TESTING MACHINE

Application filed June 15, 1928. Serial No. 285,684.

This invention relates to machines for simultaneously comparing and testing the relative efficiencies and durabilities of files, hack saws, and the like, with similar characteristics of similar instruments taken as standards.

The main object of the invention is to provide a machine by which users of the type of instrument referred to can make comparative tests to aid them in determining the relative cutting speeds and lives of such instruments, and to determine which of such instruments, independent of initial purchase price, is the most economical and desirable to use.

Another object of the invention is to determine the comparative durability of such instruments by counting the number of filing strokes necessary to destroy the cutting capacity of the files, saws or the like.

A further object of the invention is to provide a testing machine of the type referred to which will indicate on a scale the comparative cutting efficiencies of two cutting instruments being tested by the machine.

Other objects of the invention will become apparent as the detailed description thereof proceeds.

In the drawings:

Fig. 1 is a fragmentary perspective view of the file testing machine;

Fig. 2 is a plan of the machine with parts broken off to facilitate disclosure;

Fig. 2ª is a detail elevation, partly broken away, of the upper left hand corner of the machine as shown in Fig. 2;

Fig. 2ᵇ is a sectional fragmentary detail of cam and crank operating connections shown in Fig. 2;

Fig. 2ᶜ is a sectional detail of parts of the bar locking mechanism shown in Fig. 2;

Fig. 3 is a side elevation of the machine, with parts broken away to show details of construction;

Fig. 4 is a side elevation of the machine showing the parts displaced from their positions shown in Fig. 3;

Fig. 5 is a fragmentary plan view showing part of the testing machine at the start of a cutting stroke;

Fig. 6 shows part of the machine at the finish of a cutting stroke;

Fig. 7 is a fragmentary sectional detail of part of the machine for supporting a testing bar;

Fig. 8 is a detail in elevation of part of the test bar locking mechanism;

Fig. 9 is a plan of the parts shown in Fig. 8;

Fig. 10 is a perspective view of a part of said locking mechanism;

Fig. 11 is an end elevation of the machine; and

Fig. 12 is a vertical transverse section taken on the line 12—12 of Fig. 2.

Referring to Fig. 1 of the drawing, the invention comprises framework including horizontal runners 1 and 2 connected by an end piece 3 integral therewith. The opposite ends of the runners 1 and 2 are suitably secured by a cross channel iron 4 to form a supporting table.

Transverse channel irons 5 and 6 extend along the base of the framework from one side to the other, and centrally thereof support a casing 7 containing speed reducing mechanism (not shown) adapted to be operated by a worm gear shaft 8 of the usual type connected up to a motor (not shown).

Extending in opposite direction through the gear casing 7 is an operating shaft 9 having a crank 10 keyed on to one end thereof and having a similar crank 11 keyed on to the other end thereof. Interposed between the cranks 10 and 11 and shoulder bosses 12 and 13, respectively, are cam members 14 and 15. These bosses 12 and 13 form bearings for shaft 9, and the cam members 14 and 15 are provided with comparatively large apertures 16 and 17 clearing said shaft.

The cam members 14 and 15 are bolted in proper position on the cranks 10 and 11, respectively, by bolts 18, and these cam members operatively engage rollers 19 and 20, respectively, mounted on the ends of levers 21 and 22 which control the movements in one direction of two test bars 32. The levers 21 and 22 are fulcrumed intermediate their ends on bracket 26 depending from an inverted U-shaped cross bar 27, and at their ends opposite the cam supported end are pivotally connected to brake rods 28 and 29, respectively.

The brake mechanisms controlled by these brake rods are supported on the runners 1 and 2, and since they are identical in every respect the details of only one of these mechanisms will be described. These details are shown more clearly in Figs. 5 to 10, inclusive, and in Fig. 12.

As shown particularly in Figs. 8, 9, 10, and 12 the runner 1 has suitably secured thereto a block 30 provided with a rectangular aperture 31 in which is slidably mounted a test bar 32. To the bottom of block 30 there is bolted a horizontal supporting member 33 provided with rollers 34 and 35 which serve as antifriction supports for the test bar 32.

The test bar 32 has a U-shaped member 36 (see Figs. 1, 11 and 12) bolted thereto by bolts 37; and a hook 38 depending from member 36 has a chain 39 secured thereto, and passing over a horizontal pulley 40, and a vertical pulley 41 at one end of the machine to carry a weight 42. The weight 42 normally tends, through the chain 39 and the pulleys 40 and 41, to move the test bar 32 perpendicularly through the vertical side of the runner 1 and into contact with the file 43 detachably secured to a slide 44.

A hook plate 45 secured to block 30, through the horizontal flange of runner 1, has lips 46 and 47 spaced apart to receive trunnions 48 and 49 formed on a block 50 secured to the end of rod 29. The block 30, below the rod 29, is provided with a bore 51 to communicate with aperture 31; and in this bore 51, a headed stud 52 is slidably mounted.

Rod 29 is provided with a screw-threaded aperture 53 in which a screwthreaded rod 54 is adapted to be adjusted by a slot 55 in the end thereof, a lock nut 56 being used to secure the rod 54 in adjusted position on rod 29.

A coil spring 57 surrounds the bolt 58, forming the pivot between the ends of lever 22 and rod 29, and abuts at one end against a washer 59, while its other end abuts against a washer 60 adjustable by nut 61 on bolt 58 to regulate the tension of said spring 57.

It will be evident from Fig. 12 of the drawing that the headed stud 52 is held in contact with the test bar 32 by the weight of the brake rod 29, and that when this rod has its end connected to the lever 22 depressed the pressure of the stud 52 on the test bar 32 will be increased accordingly, and is intended by such depression to have its pressure increased sufficiently to hold the test bar against sliding movement in the block 30.

The lever 22 is operated by the cam 10 during the return stroke of the file carrying slide to depress the brake rod 29 and hold the test bar in locked position. In order to provide for a yielding pressure by the lever 22 on the brake rod 29 the spring 57 is provided as previously described. From Fig. 12 it will be apparent that downward movement of the brake rod 29 beyond its braking contact with stud 52 is prevented by the yielding of the spring 57 under continued downward movement of the end of lever 22.

This provision for yielding separation of the lever 22 from the end of brake rod 29 prevents breaking of the rod 29 by undue pressure of the lever 22 in cases where test bar of different thicknesses may be inserted in the machine. The force of this downward yielding pressure of the lever 22 on the brake rod 29 may obviously be varied to any desired degree by adjustment of the nut 61.

The cam member 10 is so shaped that its highest part 62 operates during the backward stroke of the file carrying member to lock the test bars out of contact with the file in a manner hereafter described.

The file 43 is adapted to be detachably secured to a sliding plate 44 by means of clamping plates 64 and 65, bolted to the plate 44 by the bolts or headed machine screws 66. The sliding plate is provided with a dovetailed recess 67, adapted to fit over a correspondingly shaped slide member 68, bolted at its opposite ends to standards 69 and 70, secured at their lower ends to cross members of the framework.

In order to reciprocate the sliding plate 63 the crank 11 has a pitman 71 pivotally connected to its free end, and the other end of this pitman is pivotally connected to a stud 72 formed integral with the plate 73 bolted to one end of the sliding plate 44.

Since all the parts supported by the runner 2 are identical with those supported by runner 1, and since the machine is symmetrical with respect to the plane bisecting the machine longitudinally the corresponding parts need no further description and are identified by reference numerals similar to the parts already described.

As shown in Figs. 3 and 4 the movement of the slide 44 on fixed slide members 68 toward the shaft 9 constitutes the cutting stroke of the file 43. During this forward or cutting stroke the rollers 19 and 20 ride over the lowest cam surface 74 of the cam member 10, and thereby permit the stud 52 to engage the test bars 32 with slight friction due only to the weight of the brake rod 29, and permit the weights 42 through the chain and pulley mechanism, to hold the test bars with uniform force against the files 43.

On the return stroke of the file carrying slides 44 the higher part 62 of the cam 10 engage the rollers 19 and 20 and depress, through the levers 22, the brake rods 28 and 29 to lock the test bars in the position occupied by them at the end of the cutting stroke. In order to provide for removal of the files 43 from contact with the test bars 32 during the rearward stroke of the files, the slides 44 are tapered slightly from their ends remote from the crank shaft 9 inwardly toward their ends adjacent said crank shaft.

The handle ends of the files must always be placed against the wide end of the slide 44 to insure the test bars being held out of contact on the return stroke as will be obvious from the fact that the test bars become locked in position on the runners 1 and 2 as soon as the cutting stroke is completed.

In order to facilitate movement of the test bars 32 in the blocks 30 each of said blocks is provided with recesses 75 and 76 in which antifriction balls 77 and 78 are mounted by means of the set screws 79 and 80 acting in opposition to yieldingly mounted pins 81. As will be seen in Fig. 7 the set screws 79 and 80 and the cooperating pins 81 are made concave in order to fit over the balls and hold them in position in the blocks 30.

Mounted upon the framework and below each of the slide members 44 are scale pans 82 and 83 supported on knife edge pivots 84 and 85 secured to the end of a lever 86 which is pivoted centrally by knife edges 87 extending therefrom and supported by a standard 88 fixed to the framework of the machine.

The pan supports 82 and 83 are provided with arms 89 and 90 extending downwardly to be connected at their lower ends pivotally to a cross rod 91 designed to keep the pans 82 and 83 horizontal throughout their upward and downward movement.

The indicator 92 fixed to the center of lever 86 extends upwardly toward the top of the machine to read on a scale 93 formed on a plate 94 carried by a cross member 95 fixed to the runners 1 and 2; and an odometer or stroke counter 95 is suitably mounted on the framework to be operated by a trip 96 fixed to one of the reciprocating slides 43 in order to count the number of strokes.

The scale 94 affords a very convenient means of determining which of the two files under comparative tests is cutting the faster; and the odometer or stroke counter forms a means whereby the effective lives of different files may be readily compared.

It has been found by extensive tests on this machine that the sharpest, fastest-cutting files last longer than any of the slower-cutting files. The faster the file cuts the longer it lasts; and this is true, not only when cutting ordinary mild steel and cast iron; but it is also true of files cutting the hardest kind of tool steel. Of course it is understood in making comparison between files, the latter should be of similar size, shape and cut. This experience derived from the use of the machine is somewhat contrary to the idea frequently held, that a blunt-toothed file is more economical for heavy duty than a sharp-toothed file. It is therefore true that the stroke of a file not only gives information as to the speed of cutting but also gives the fair indication of the life of a file as compared with others of a similar type.

While the description of the use of the machine has been limited to its use in comparing the cutting quality of the files it must not be understood as limited to such use since the machine can obviously be used to determine the cutting qualities of hack saws and similar tools designed to be operated by substantially rectilinear reciprocation. Wherever the word file is used in this specification it must therefore be considered as applicable to tools of a similar nature and the claims will be drawn accordingly.

We claim:

1. A machine for comparing the characteristics of two files or the like, comprising a support, means for simultaneously reciprocating said files on said support, means for feeding a test bar against each of said files, and scales having the pans thereof arranged to receive the material removed from the test bars.

2. A machine for comparing the cutting qualities of two files or the like, comprising a support, means for simultaneously reciprocating said files, means for feeding a test bar against each of said files during the movements of said files in one direction only, means for indicating the number of reciprocations of said files, and scales having the pans thereof arranged to receive the material removed from the test bars during the indicated number of reciprocations of said files.

3. A machine for comparing the cutting qualities of two files or the like, comprising a base having a pair of parallel supports fixed thereto, file supporting slides reciprocable on said supports, means for simultaneously reciprocating said slides on said supports, test bars in contact with said files, scale pans arranged below said slides and means connected to said pans to indicate the difference in weight between the material collected therein by filing said test bars.

4. A machine for comparing the cutting qualities of two files or the like, comprising a base having a pair of parallel supports fixed thereto, tapered file supporting slides reciprocable on said supports, test bars slidable perpendicularly toward said supports, means for simultaneously reciprocating said slides on said supports, means to hold said test bars from contact with the files on said slides during the movement thereof in the direction of the wide end of said slides, and means for indicating the difference in weight between the material collected by filing said test bars during the same number of strokes of each slide.

5. In a machine for testing the efficiency of files or the like comprising a support, a carrier mounted reciprocably on said support, means for detachably connecting a file to said carrier, means for reciprocating said carrier, a test bar arranged at right angles to said carrier, means connected to the last named means for locking the test bars in fixed position out of contact with the files during the backward movement thereof.

6. In a machine for testing the efficiency of files and the like, a support, means for reciprocating a file on said support, a lever fulcrumed on said support, a test bar, means for moving said bar against said file, and means operated by the lever at the end of a file cutting stroke to prevent movement of said bar by said moving means during the back stroke of said file.

7. In a machine for testing the efficiency of files and the like, a support, a test bar, means for moving said test bar at right angles to said support, a tapered slide, interposed between said support and bar, means for detachably securing a file on said slide, means for reciprocating said slide, and means operable by said reciprocating means at the end of a cutting stroke of said file for holding said bar from contact with said file during the back stroke thereof.

8. In a file testing machine, a frame, a slide reciprocable in said frame and having means for detachably securing a file thereto, means for moving a test bar against said file, means for reciprocating said slide, and means operated by said reciprocating means at the end of the cutting stroke of said file for holding the test bar fixed and out of contact with the file during the back stroke thereof.

9. In a file testing machine, a frame, a file supporting slide reciprocable on said frame, a test bar slidable in said frame at right angles to the path of movement of said slide, means for moving said bar into contact with a file carried by said slide, means for reciprocating said slide, a brake pin resting normally on said test bar, and mechanism operably connected to the last named means for increasing the pressure of said pin on said bar to hold said bar in locked position during the movements of the slide in one direction.

10. In a file testing machine, a frame, a file supporting slide reciprocable in said frame, a test bar slidable in said frame at right angles to the path of movement of said slide, means for moving said bar into contact with a file carried by said slide, means for reciprocating said slide, mechanism for holding said bar from contact with the file during movement of the slide in one direction, means for counting the number of reciprocations of the slide, and means for indicating the difference in weights of metal removed from said test bars during any number of reciprocations indicated by said counting means.

11. A machine for testing files, saw blades and the like, comprising means for reciprocating a file, a test bar, means for moving the test bar into contact with said file, a pin in loose supported contact with said bar, and mechanism operated by said means to engage said pin and cause it to hold the bar against movement toward the file when the file moves in one direction and to release it when the file moves in the opposite direction.

12. A machine for comparatively testing two files, comprising means for reciprocating said files in contact with test bars of standard material and cross section and scales positioned to receive the material removed from the test bars during the operation of the machine for indicating the difference in the weights of the said removed material.

In testimony whereof we affix our signatures.

LARS CHRISTIAN NIELSEN.
WINTERS BOWERS FOX.